United States Patent [19] [11] 4,155,115
Wilske [45] May 15, 1979

[54] PROCESS CONTROL SYSTEM WITH ANALOG OUTPUT CONTROL CIRCUIT

[75] Inventor: Lowell D. Wilske, Phoenix, Ariz.

[73] Assignee: Honeywell Inc., Minneapolis, Minn.

[21] Appl. No.: 866,002

[22] Filed: Dec. 30, 1977

[51] Int. Cl.² .............................................. G06F 15/46
[52] U.S. Cl. .................................. 364/107; 364/103; 364/600; 364/900
[58] Field of Search ............... 364/100, 103, 104, 107, 364/114, 117, 600, 601, 602, 200, 900

[56] References Cited

U.S. PATENT DOCUMENTS

| | | | |
|---|---|---|---|
| 3,243,582 | 3/1966 | Holst | 364/600 |
| 3,443,074 | 5/1969 | Schmid | 364/600 |
| 3,493,731 | 2/1970 | Lemonde | 364/601 |
| 3,761,689 | 9/1973 | Watanabe et al. | 364/601 |

*Primary Examiner*—Joseph F. Ruggiero
*Attorney, Agent, or Firm*—Laurence J. Marhoefer; Lockwood D. Burton

[57] ABSTRACT

An analog output control circuit provides an arrangement whereby digital data from the control computer is supplied simultaneously to a number of output boards along with address data for selecting a particular one of the several boards. Logic control means is provided for responding to an address code for enabling the selected board. Additional control logic is provided for responding to control signals from the computer for selecting a particular one of the several output units included on the output circuit board. Control logic is also provided to prevent the output units from being changed in the absence of logic control or power supply.

3 Claims, 2 Drawing Figures

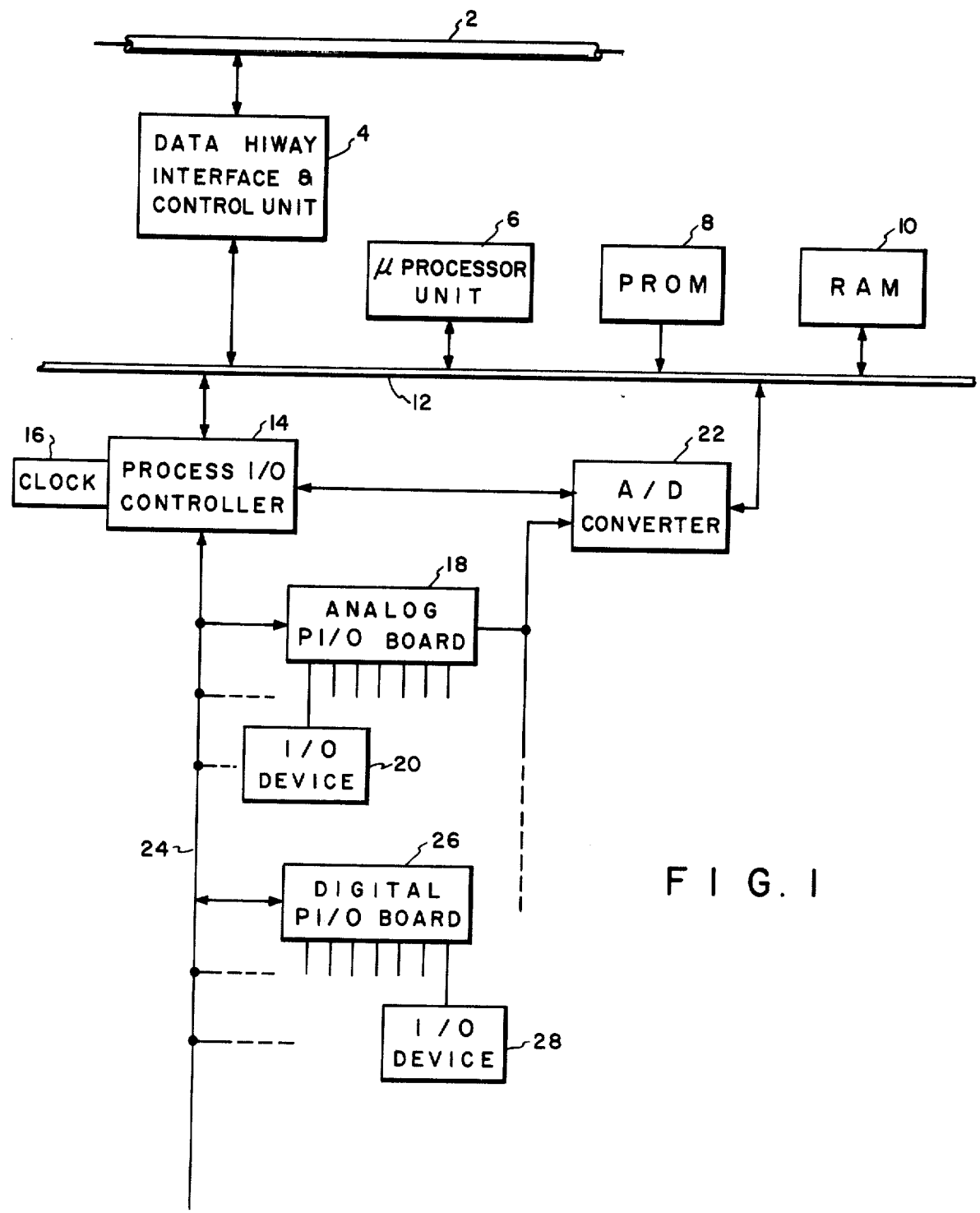
F I G. 1

PROCESS CONTROL SYSTEM WITH ANALOG OUTPUT CONTROL CIRCUIT

BACKGROUND OF THE INVENTION

The present invention relates to process control apparatus. More particularly, it relates to improved analog output circuitry for use with a digital computer based process control system.

In the art of industrial process control, there have been provided systems wherein various parameters of a process are measured, compared with a desired value, and a difference there between used to derive a control or output signal. Frequently, both the input, or measured variable signals and the output signals are in the form of analog signals. Most popularly, in multiple loop systems, analog signals are converted to digital signals for processing by a digital computer in accordance with an applied algorithm. Then, the digital output control signals are converted to analog signals for application to the ultimate control element. In the interest of economy and convenience, it is desirable that a plurality of individual output devices be controllable from a single output control board.

SUMMARY OF THE INVENTION

It is, accordingly, an object of the present invention to provide an improved analog output circuit for digital computer based process control systems.

It is another object of the present invention to provide an improved analog output circuit as set forth having the capacity for controlling a plurality of individual output devices.

In accomplishing these and other objects, there has been provided, in accordance with the present invention, an analog output control circuit wherein digital data from the control computer is supplied simultaneously to a number of output boards along with address data for selecting a particular one of the several boards. Logic control means is provided for responding to an address code for enabling the selected board. Additional control logic is provided for responding to control signals from the computer for selecting a particular one of the several output units included on the output circuit board. Control logic is also provided to prevent the output units from being changed in the absence of logic control or power supply.

DESCRIPTION OF THE DRAWINGS

A better understanding of the present invention may be had from the following detailed description when read in the light of the accompanying drawing in which:

FIG. 1 is a block diagram of a computer based process control system embodying the present invention;

DETAILED DESCRIPTION

Figure 2:
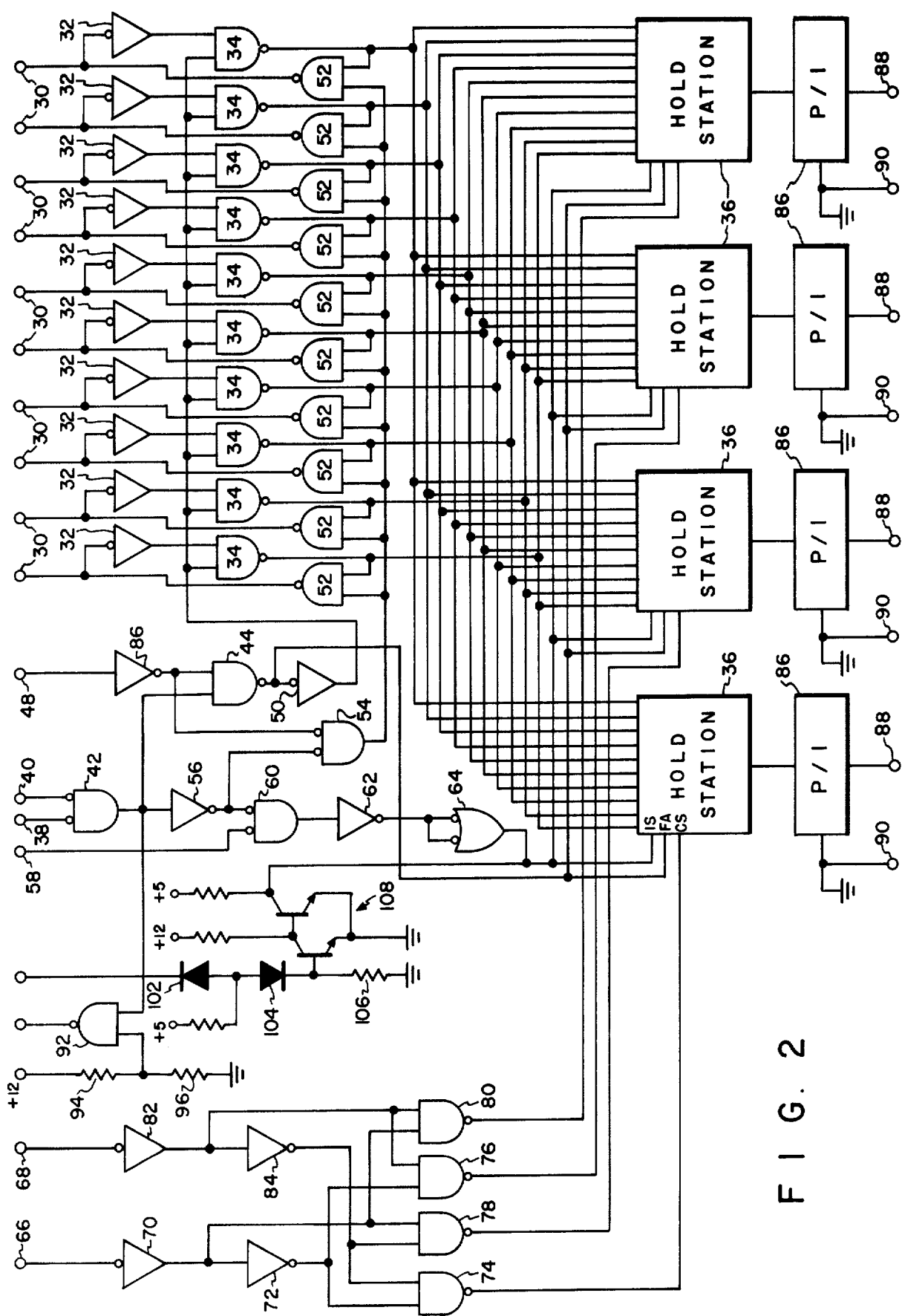
FIG. 2 is a logic block diagram of an analog output control board embodying the present invention.

Referring now to the drawing in more detail, there is shown in FIG. 1 in block diagram form a computer based control system such as is shown in copending application of Woods et al, Ser. No. 773,913, filed Mar. 3, 1977. In FIG. 1, there is shown a data highway, or communication bus 2, for communication with the host computer. A data highway interfacing control unit 4 interfaces that communication bus with a subordinate control system. The subordinate control system includes a microprocessor unit 6, a PROM 8, in which is stored, among other things, the operational program for the microprocessor unit 6. There is also provided a RAM 10 in which is stored, among other things, database tables for each of the data points involved in the control system. These are all interconnected with each other and with the data highway interface control unit 4 by a microprocessor bus 12. Operatively connected to the bus 12 for responsive communication with the microprocessor unit 6 is a process input/output controller 14. The process input/output controller 14 includes a clock 16 which generates a series of clock pulses for the coordinate operation of the apparatus connected to be responsive to the process input/output controller 14. Included among the apparatus connected to the process input/output controller 14 is one or more analog process input/output boards 18 each having up to eight analog input or output devices 20. An analog to digital converter 22 is connected to the analog process I/O boards 18 to convert the analog input signals into digital signals for use by the microprocessor unit 6. Further, there is connected to the process I/O controller 14 through the process I/O bus 24 a digital process I/O board 26 to which are connected a plurality of digital input or output devices 28.

Under the control of the microprocessor unit 6, process data is gathered from the analog or digital input devices and applied through the process I/O controller 14 to the microprocessor unit 6 for manipulation in accordance with the control algorithm for the particular data point. Also under the control of the microprocessor unit 6, output control signals are applied through the process I/O controller 14 to the analog and/or digital output boards 18 and 26 to the respective control devices or output devices 20 and 28.

In the present case, it is the analog output board 18 which is of particular interest. To this end, there is shown in FIG. 2 a detailed logic diagram of an analog output circuit such as may be included in the analog output board 18. In the microprocessor bus 12, there are included ten leads for digital representation of analog output data. The analog output board 18 includes output circuits for four analog output devices 20. In the system, there may be a significant number of analog output boards 18, each accommodating four output devices. Thus, the ten lines in the microprocessor bus 12 carrying digital representations of analog output data from the microprocessor unit 6 potentially represents the output of any one of the four output devices in each of the analog output boards. The ten lines carrying the digital data are connected respectively to the ten input terminals 30. Each of the input terminals is connected through an inverter 32 to one input terminal of a corresponding number of NAND gates 34. The other input terminal of each of the NAND gates 34 is connected to be enabled by the output signal from an address logic circuit. The output of each of the NAND gates 34 is connected to a corresponding input terminal of all four of the hold stations 36. The hold stations 36 are illustrated in block diagram form; they are or may be a commercially available module such as a dual digital to analog converter type identified as DAC1600 manufactured by General Instruments Corporation. The hold station is characterized in a capacity to accept a ten bit digital input word and produce an output signal which is a substantially 1 kilohertz constant frequency signal having a variable duty cycle which varies in accordance with the magnitude of the value of the input digital word whenever the individual hold station has been suitably enabled. The enabling of the hold stations will be discussed hereinafter.

In an exemplary embodiment of the present invention, the analog output board is one of a number of similar boards that is arranged in four card file assemblies with up to eight such boards in each card assembly. Thus, to address any particular board, the microprocessor sends a coded signal representative of the selected card file assembly and board to the process I/O controller 14. The process I/O controller 14 then decodes these address signals and transmits a signal to an input terminal 38 indicative that the particular card file has been selected. The process I/O controller 14 also, as a result of decoding the address signal from the microprocessor, sends a second signal which is applied to an input terminal 40 indicative that the particular board in the card file has been selected. The input terminals 38 and 40 are connected to the two input terminals of a NAND gate 42. The output of the NAND gate 42 is connected to one input terminal of a second NAND gate 44, the other input terminal of which is connected to the output of an inverter 46. The input of the inverter is connected to a terminal 48 which receives a "function" signal from the microprocessor unit by way of the process I/O controller 14 indicative of a "read" or a "write" function. A "write" function signal will cause the NAND gates 44 to be "made". When the gate 42 has been "made" by the address signals, the output of the gate 44 is connected to the input of an inverter 50, the output of which is connected to the enabling input terminal of the gates 34.

The output terminals of the gates 34 are also connected, respectively, to one input terminal of the NAND gates 52. The other input terminals of the gates 52 are connected by an enabling lead to the output of a NAND gate 54. One input terminal of the NAND gate 54 is connected to the output of the inverter 46. The other input of the NAND gate 54 is connected to the output of an inverter 56 which, in turn, has its input connected to the output of the gate 42. Thus, the gate 54 will be "made" when the particular board has been addressed and the direction signal is for a "read" function. The making of the gate 54 enables the gates 52 allowing them to read back to the process I/O controller, and, thence, to the microprocessor, the signals which appear at the output of the several gates 34.

It was previously stated herein that the hold stations 36 would be operative to respond to the signals on the ten data lines if they had been properly enabled. There are three different signals necessary to effect the operative enabling signals of any one of the hold stations 36. The first of the enabling signals is an "input strobe" (IS) signal which is applied to the input terminal 58. The terminal 58 is connected as one input to a NAND gate 60, the other input terminal of which is connected to the output of the inverter 56. The output of the NAND gate 60 is applied to the input of an inverter 62, the output of which is connected to both input terminals of an inverting NOR gate 64. The output of the NOR gate 64 is ordinarily biased to a logical "low" condition through the logic chain feeding it. When the board is addressed, the signals applied to the input terminals 38 and 40 and a "strobe" signal is applied to the input terminal 58, the gate 60 is "made" producing a logical "low" at the output of the inverter 62 causing the output of the NOR gate 64 to go to a logical "high", and applied as an "input strobe" signal to all four of the hold stations 36.

In each of the hold stations, there are several storage registers. A selection of which of those registers is to be receptive to the input signals is controlled by a signal applied to an address terminal (FA) at the hold station. That signal is derived from the address and direction signals and is taken from the output of the gates 44. This, effectively, comprises the second enable signal for the hold station. The third enable signal for the hold stations comprises a "chip select" signal applied to the corresponding input terminal (CS) on the hold station chip. With four hold stations on each board, a selection of one of those four hold stations may be accomplished by a two-bit selection code applied to the input terminals 66 and 68. The input terminal 66 is connected to an inverter 70. The output of the inverter 70 is connected to a second inverter 72. The output of the inverter 72 is connected to one input of each of two NAND gates 74 and 76. The output of the inverter 70 is connected also to one input terminal each of two NAND gates 78 and 80. The input terminal 68 is connected to the input of an inverter 82, the output of which is connected to a further inverter 84. The output of the inverter 82 is connected to the second input terminal of each of the two NAND gates 76 and 80. The output of the inverter 84 is connected to the second input of each of the two NAND gates 74 and 78. Thus, with four possible conditions of the two input signals applied to the terminals 66 and 68, a unique one of the gates 74, 76, 78 and 80 will be "made". The outputs of those four gates are applied, respectively, to the "chip select" input terminal of the corresponding one of the hold stations 36. These signals comprise the third enable signal for the hold stations. Accordingly, at any one time, only one of the hold stations can be enabled as a result of the selection logic connected to the two input terminals 66 and 68.

As was pointed out hereinbefore, the activated hold station has the capacity to convert the 10-bit digital code to a one kilohertz signal of constant frequency but having a variable duty cycle, variable in accordance with the digital input code. The output of each of the hold stations is connected, respectively, to a pulse-to-current converter 86; the pulse-to-current converters are substantially as shown in U.S. Pat. No. 3,991,323. These converters are capable of receiving a variable duty cycle pulse signal at the input thereof and producing a D.C. level signal at the output thereof which is a function of the duty cycle of the input signal. The D.C. level of the current signal thus produced is applied from the converter 86 to a corresponding output terminal 88 on each of the converters. That output terminal 88 may be connected to a suitable ultimate control element which responds to analog signals to effect a necessary process control. A return lead from that ultimate control element may be connected to the return lead terminal 90 each of which is, in turn, connected to ground.

The output of the gate 42 is connected to one input of a NAND gate 92. The other input of the NAND gate 92 is biased to be enabled by a logical "high" signal derived from the power supply circuit of the output circuit board. A pair of voltage dividing resistors 94 and 96 are serially connected between the power supply terminal and ground. The junction between those resistors is connected to the second input of the gate 92. When the particular board is addressed by the microprocessor, the output of the gate 42 will go to a logical "high" allowing the gate 92 to be "made" if the board is being properly powered. When the gate 92 is "made", a signal is transmitted, via the terminal 98, to the microprocessor indicative that the addressed board is present and powered.

The terminal 100 is arranged to receive a "master clear" signal from the microprocessor. That terminal is connected to the cathode of a first diode 102, the anode of which is connected to the anode of a second diode 104. The cathode of the diode 104 is connected through a resistor 106 to ground. The junction between the cathode of the diode 104 and the resistor 106 is connected to the base input of a transistor pair 108. When a logical "high" is present on the terminal 100, the diode 102 is back-biased, maintaining the transistor pair is a cut-off condition. In the cut-off condition, the output thereof is biased "high" allowing the "input strobe" signal to be effective at the output of the inverter 64 when it occurs. When a logical "low" is applied to the input terminal 100, the diode 102 becomes forwardly biased, causing the transistor pair 108 to become conductive. With the transistors 108 conductive, the output thereof is clamped to a logical "low", inhibiting the application of an input "strobe" signal to the hold stations 36 during the presence of the "master-clear" signal. This protects the content of the hold stations, hence the output signals during an interval when the "master-clear" signal is effective.

The output of the hold station, module 36, is highly accurate with respect to the variable duty cycle and in and of itself constitutes an analog output signal. However, the voltage level of that output signal is not particularly stable. Accordingly, it is desirable to provide an output circuit such as a pulse-to-current converter which responds to the variable duty cycle of the pulse and without regard to the possible variations in the voltage level of the pulse signals to produce a current output signal which is highly stable, highly accurate.

Thus, there has been provided, in accordance with the present invention, an improved analog output circuit for use with a digital computer based process control system.

The embodiments of the invention in which an exclusive property or privilege is claimed are defined as follows:

1. A digital computer based process control system including an analog output control circuit and digital computer means for supplying digital data and control signals to said output control circuit, said analog output control circuit comprising:

a plurality of digital data input terminal means for receiving digital data signals from said computer means;

a plurality of gating means corresponding in number to said input terminal means, said gating means each having one input connected to a corresponding one of said input terminal means;

a plurality of digital data-to-pulse duration converters, each of said converters having a plurality of digital data input means corresponding in number to said plurality of gating means;

means connecting the output of each of said gating means to a corresponding one of the input means of all of said converters;

signal responsive logic control means including means responsive to address signals derived from signals supplied by said computer means, and to strobe and direction signals also supplied by said computer means;

said signal responsive logic control means being connected to control the enabling of said gating means;

said signal responsive logic control means being further connected to control the selective operation of said converters in accordance with the control signals supplied from said computer means; and pulse duration-to-current converter means connected to the output of each of said digital data-to-pulse duration converters, thereby to provide an output current which is a function of said digital data input signals.

2. A digital computer based process control system as set forth in claim 1 wherein said signal responsive logic control means includes decoding means for decoding selection control signals from said computer means to provide a selection of said digital data-to-pulse duration converters whereby to enable a single one of said converters at any one time.

3. A digital computer based process control system as set forth in claim 2 wherein said analog output control circuit is one of a plurality of such output control circuits connected to said digital computer means, said digital data signals being applied simultaneously to corresponding one of said digital data input terminals of all of said plurality of analog output control circuits, said address signals applied to said signal responsive logic control means being address signals indicative of which of the analog output control circuits is to receive said digital data signals.

* * * * *